June 8, 1965     T. J. BEAHN ETAL     3,187,580
APPARATUS FOR MEASURING THE PRESSURE OF GAS
Filed Feb. 25, 1963     2 Sheets-Sheet 1
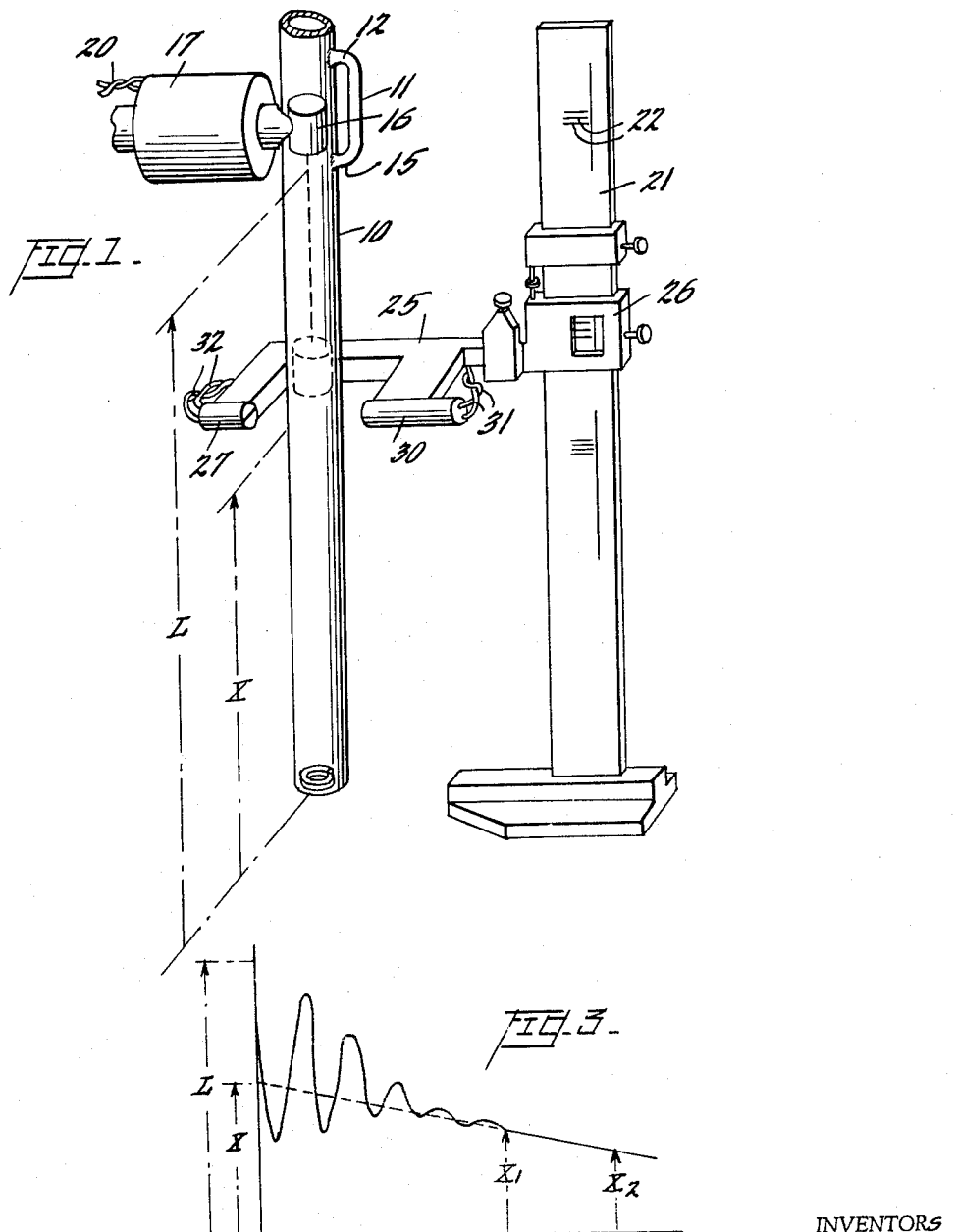
INVENTORS
Thomas J. Beahn
William J. Condell, Jr.
Hirsch I. Mandelberg,
BY
ATTORNEY June 8, 1965  T. J. BEAHN ETAL  3,187,580
APPARATUS FOR MEASURING THE PRESSURE OF GAS
Filed Feb. 25, 1963  2 Sheets-Sheet 2

INVENTORS
Thomas J. Beahn
William J. Condell, Jr.
Hirsch I. Mandelberg
BY
ATTORNEY United States Patent Office 3,187,580
Patented June 8, 1965

3,187,580
APPARATUS FOR MEASURING THE
PRESSURE OF GAS
Thomas Joseph Beahn, 7981 New Riggs Road, Adelphi,
Md.; William John Condell, Jr., 2516B Holman Ave.,
Silver Spring, Md.; and Hirsch Israel Mandelberg,
3402 Callaway Ave., Baltimore 15, Md.
Filed Feb. 25, 1963, Ser. No. 260,924
4 Claims. (Cl. 73—419)
(Granted under Title 35, U.S. Code (1952), sec. 266)

The invention described herein may be manufactured and used by or for the Government for governmental purposes without the payment to us of any royalty thereon.

This invention relates to apparatus for measuring the pressure of gas, and more particularly to apparatus for measuring the pressure of gas in the millimeter-of-mercury range.

It is frequently necessary to measure pressure in the millimeter-of-mercury range in gas systems requiring the highest possible gas purity. To maintain gas purity, the pressure gauge should be bakeable and introduce no contamination. In addition, the gauge should be simple to operate and independent of the kind of gas being measured. Liquid manometers, such as oil and mercury, have been widely used and do meet the requirements when they are used with some sort of trapping. The trapping, however, introduces difficulties which are very often objectionable, especially in static systems. Mechanical gauges using thin diaphragms or coils have been used successfully but generally suffer from creep and permanent set when they are made for high sensitivity. Consequently, these gauges are used as null devices and require a reference pressure system.

Although some forms of mechanical gauges are very acceptable, the added complexity of the reference pressure system can be considered undesirable at times. Gauges such as the Pirani, Knudsen, quartz fiber or thermocouple conceivably could be scaled to operate in the millimeter range but would require extremely close mechanical tolerances and would, in general, depend on the kind of gas being measured as well as the history of the system. Convection-dependent gases also suffer from these objections. Further, the Alphatron could be designed to meet most of the requirements but again would depend on the kind of gas being measured and would require care in handling since it must contain radio-active material. Most of these gauges have been used successfully, and each has advantages in a particular application.

It is an object of the present invention to provide new and improved apparatus for measuring the pressure of gas.

Another object of the present invention is to provide new and improved apparatus for measuring the pressure of gas in the millimeter-of-mercury range.

With these and other objects in view, an apparatus for measuring the pressure of gas in a system, embodying certain features of the invention, may include a vertically-mounted tube, a piston mounted for axial sliding movement within the tube and with some leakage being provided between the piston and the tube, means for connecting the tube to the gas system the pressure of which is to be measured in order to fill the tube with such gas, means for suspending the piston at a predetermined height within the tube and for releasing the piston so that the piston slides down the tube to compress the gas therein, the releasing of the piston causing damped oscillations of the piston superimposed on a constant downward velocity thereof, and means for measuring the times that the piston reaches predetermined points in the tube after the oscillations cease in order to calculate the point to which the piston would have come to rest had there been no leakage between the piston and the tube.

More specifically, apparatus embodying the invention may include a vertically-mounted tube of predetermined diameter which is connected to a gas system, the pressure of which is to be measured. A piston is mounted within the tube for axial sliding movement, and the diameters of the piston and the interior of the tube are such that the piston forms a substantially fluid-type seal therewith while permitting some leakage therebetween. Means are provided for suspending the piston in a predetermined, uppermost position until a pressure measurement is to be taken. At that time, the suspending means is deactivated so that the piston drops vertically within the tube, thereby compressing the gas therein.

When the piston falls, it undergoes a series of damped oscillations, it entraps a specific volume of gas and compresses it to an equilibrium pressure such that the difference between the pressures on the top and the bottom of the piston is equal to the weight per unit area of the piston. The piston, therefore, would come to rest at an equilibrium position, which can be determined by using Boyle's law, if the gas were ideal, the compression were isothermal and no gas escaped from the entrapped volume. Actually, the piston not only executes damped oscillations, but also such oscillations are superimposed on a constant downward velocity because of the leakage between the piston and the tube in which it resides. By using the present invention, the position of the falling piston is measured at two times after the initial oscillations have stopped. This gives the drop rate of the piston under all circumstances of gas and pressure. With this information, the equilibrium position of the piston, that is, the position to which it would have come to rest had there been no leakage past it, may be obtained by extrapolation to zero time from the constant velocity region. With this and other factors such as the mass of the piston, effective length of the tube, etc., an extremely accurate measurement of the pressure of the gas system can be made.

A complete understanding of the invention may be obtained from the following detailed description of a specific embodiment thereof, when taken in conjunction with the accompanying drawings, in which:

FIG. 1 is a schematic illustration of an apparatus for measuring the pressure of gas in a system of which the present invention forms a part;

FIG. 2 is a schematic diagram of a circuit which may be used in conjunction with the apparatus shown in FIG. 1, and FIG. 3 is a graph used in accordance with the teachings of the present invention.

Referring now to the drawings, and more particularly to FIG. 1, a schematic diagram of a system for measuring pressures of gases and embodying the present invention is shown therein. A tube 10 which may be made of glass or some other suitable material is secured in a vertical position by any suitable means (not shown). The upper end of the tube 10 is connected to the gas system whose pressure is to be measured, and, it will be presumed for the purposes of the present description that the volume of the system to be measured is extremely large when compared to the effective volume of the tube 10. Also formed near the upper end of the tube 10 is a cut-off tube 11, an upper end 12 and a lower end 15 of which are connected into the tube 10. A piston 16 is also shown near the upper end of the tube 10 in FIG. 1. The piston 16 may be made from steel which is polished and electroplated with copper and rhodium to a size which just permits it to slide through the tube 10. When so constructed, the piston 16 will form a substantially fluid-type axial sliding movement within the tube 10, but some leakage is permitted between the piston and the tube.

A solenoid 17 is secured adjacent to the upper end of the tube 10 by suitable means (not shown) for the purpose of holding the piston 16 in a suspended position within the tube. Any suitable solenoid may be provided, and it need only be stated here that when a suitable energizing potential is applied across conductors 20—20 connected to a coil therein, a sufficiently strong magnetic field will be created to maintain the piston 16 in its upper position as shown in solid lines in FIG. 1. Therefore, with the structure described hereinabove, that is, with the tube 10, the piston 16 and the solenoid 17, a crude form of pressure measuring device is available. With such a device, the solenoid 17 may be de-energized so that the piston 16 will fall past the lower end 15 of the cut-off tube 11 and down the tube 10 to compress the gas therein. The energy of the falling piston will be dissipated by the piston's executing a series of damped oscillations as it compresses the gas and entraps a specific volume thereof. The piston 16 will stop oscillating at an equilibrium point wherein the difference between the pressures on the top and the bottom of the piston is equal to the weight per unit area of the piston. This equilibrium position, designated by the letter $x$ in FIG. 1, may be determined by Boyle's law, and the system's initial pressure P is given in terms of $x$ as follows:

$$P \approx \frac{mg}{\pi R^2}\left(\frac{x}{L-x}\right)\left(1-\frac{\pi R^2 x}{V_0 - \pi R^2 l}\right)$$

where $mg$ is the weight of the piston 16, R is the inner radius of the tube 10, L is the length of the tube 10 from the lower end 15 of the cut-off tube 11 to the bottom of the tube 10, $V_0$ is the volume of the gas system whose pressure is to be measured, above the lower end 15, and $l$ is the length of the piston 16. The approximate-equality sign is used to indicate that an assumption that $V_0$ is much greater than $\pi R^2 l$ has been made and only the first term in a binominal expansion in these quantities has been retained. If the volume of the gauge is negligible in comparison to the volume of the system, as was assumed hereinabove, the last term can be neglected, thereby giving the following formula for the pressure of the system:

$$P = P_M\left(\frac{x}{L-x}\right)$$

where $P_M$ is the weight per unit area of the piston ($mg/\pi R^2$) and has the value of the pressure the system would have if $x$ were $L/2$, that is, the pressure at half scale.

The pressure gauge that has been described thus far would be extremely accurate if the equilibrium position ($x$) were obtained with a gas that is ideal, where the compression is isothermal, and where no gas escapes from the trapped volume. Actually, as described above, the piston 16 not only executes a series of damped oscillations but such oscillations are superimposed on a constant downward velocity because of the leakage between the piston and the tube 10. Because of this, the equilibrium position shows wide variations even for a single gas, and is not reproducible from gas to gas. The calibration of a gauge such as that just described might be good for one gas, but not for a variety of gases. This is due to the variations of friction in the gauge and the difference in the drop rate of the piston from gas to gas.

To account for the variations of friction in the gauge and the differences in the drop rate of the piston when the pressures of different gases are to be measured, the value of $x$ for a given pressure may be obtained, in accordance with the principles of the present invention, by extrapolating to zero time from the constant velocity region. This assumes that the net flow of gas past the piston is independent of the presence of the oscillations and that any variance in friction from drop to drop does not affect the method. The gas flow can be calculated with the assumptions of viscous flow with slip (see, for example, page 294 of E. H. Kennard's Kinetic Theory of Gases). This flow rate is then equated to the amount of gas displaced per unit time by the falling piston in the constant-velocity region, and an expression for the piston velocity may be calculated as follows:

$$v = \frac{mg}{6\pi\eta l}\left(\frac{d}{R}\right)^3 \frac{P + P_M/2 + 6S_1/d}{P + P_M/2}$$

where $d$ is the clearance between the piston 16 and the tube 10, $\eta$ is the coefficient of viscosity of the gas and $S_1$ is related to the slip distance S by $S_1 = SP$ and has the value of about one mean free path at unit pressure. The assumption that $d$ is very much smaller than R has been made in the derivation of the above equation.

The importance of the velocity of the piston 16 derives from the procedure used, in accordance with the present invention, to find the isothermal equilibrium position $x$. This procedure involves the measurement of two time intervals, viz., the time $t_1$ between the piston's passing the lower end 15 of the cut-off tube 11 and its reaching a given point along the tube 10 after oscillations have ceased, and the time $t_2$ for the piston's length to pass the given point. The second time interval is simply the length of the piston 16 divided by its velocity. The value of $x$ is thus given by $$x = x_1 + t_1 l/t_2 = x_1 + t_1 v$$

where $x_1$ is the distance between the given point and the bottom of the tube 10. By combining the four equations listed above, one has a complete description of the pressure measurement. Since the times $t_1$ and $t_2$ are the unknown factors in the above equations, the structure for obtaining these times will now be described.

Referring again to FIG. 1, the schematic diagram thereof shows a machinist's height gauge 21 having graduations 22—22 which are used in conjunction with the tube 10 to determine the various heights of the piston 16 therein. A bracket 25 is secured to a movable gauging member 26 of the height gauge 21 in order to locate the bracket accurately. A photocell 27 is secured to the bracket 25 on one side of the tube 10 and a lamp 30 is secured to the bracket 25 on the opposite side thereof. Light from the lamp 30 may be passed through a series of slits for collimation, but such details are well known to those skilled in the photocell art and need not be described further here. For the present purposes, it is only necessary to state that the lamp 30 is enregized by placing a proper potential across two conductors 31—31 associated therewith, and that an output is taken from the photocell 27 across two conductors 32—32 when light from the lamp is cut off therefrom.

As mentioned hereinabove, the present invention involves measuring the position of the piston 16 at two times after the initial oscillations thereof have stopped. How this is done will now be described by referring to the circuit shown in FIG. 2, and how the information obtained therefrom is used will be described herein below. Referring to FIG. 2, the function of the circuit shown therein is to measure two time intervals which were referred to above as $t_1$ and $t_2$. The time $t_1$, as was mentioned above, is the time interval between the piston's passing the lower end 15 of the cut-off tube 11 and its reaching a given point along the tube 10 after its oscillations have ceased. Since the piston 16 falls to the lower end 15 of the cut-off tube 11 as soon as it is released by the solenoid 17, $t_1$ also measures the time between the piston's being released and its reaching the given point along the tube after oscillations have ceased. The time $t_2$ is that length of time that it takes for the piston's length to pass the given point mentioned above. As will be seen, this second time interval is simply the length of the piston divided by its velocity.

To the left of the circuit shown in FIG. 2, a simplified version of the structure shown in FIG. 1 has been reproduced, and the various elements thereof are designated similarly. The various conductors associated with the electrical components of FIG. 1 are shown in FIG. 2 as being connected to left-hand terminals of a plug 35. For the purposes of the present description, it will be assumed that the plug 35 is secured in place and that the left-hand terminals thereof are short-circuited to the right-hand terminals of the plug. Thus, the conductors 32—32 connect the photocell to terminals "3" and "4" of the plug 35. Likewise, the conductors 20—20 connect the solenoid 17 to terminals "5" and "6" of the plug 35. Conductors 31—31, associated with the lamp 30, connect the lamp to terminals "7" and "8" of the plug 35. Finally, a push-to-open, start switch 36 is connected across the terminals "1" and "2" of the plug 35, thereby shorting these terminals when the start switch 36 is in the closed position shown in FIG. 2. As will be described, when the piston 16 is to be released from its upper position in order to make a pressure measurement, the start switch 36 is pushed and opened in order to start the measurement.

The circuit of FIG. 2 is shown at the time immediately prior to making a pressure measurement. At this time, 110 volts A.C. is applied across input terminals 37 and 40, and a power switch 41 is closed. The upper terminal 37 is connected to a junction point 42 and, for the purposes of the present description, will be considered to be the side having 110 volts A.C. thereon. The opposite side of the input, the ground or reference side, is connected through the switch 41 to a junction point 45 and to a common or grounded conductor 46. Under these conditions, 110 volts A.C. is applied to an anode 47 of a diode rectifier 50 to maintain the diode conductive. A cathode 51 of the rectifier, from which an output is taken, is connected to an RC filter 52 which is connected to an armature 55 associated with a relay winding 56.

As will be shown, the relay winding 56 is energized at this time so that the armature 55 is connected to a back contact 57 associated therewith in order to apply 110 volts D.C. to a conductor 60 which is connected to one end of a relay winding 61. The other end of the relay winding 61 is connected to an anode 62 of a tetrode 65 which also includes a control grid 66 and a cathode 67. The control grid 66 is connected over conductors 70 and 71 to terminal "3" of the plug 35 and to the photocell 27. However, at this time, light from the lamp 30 is permitted to strike a photocell 27 since the piston 16 is being held in its upper, suspended position by the solenoid 17. The photocell 27 is of the type which exhibits zero resistance when light is striking it and a high resistance when light is shielded therefrom. Consequently, since the photocell 27 exhibits zero resistance at this time, no output is applied to the conductors 70 and 71 to the control grid 66 of the tetrode 65; consequently, the tetrode 65 is biased so that it is not conducting, and the relay winding 61 is de-energized at this time, as shown in FIG. 2.

As stated before, the relay winding 56 is energized with the circuit in the condition shown in FIG. 2. Such energization is obtained since the 110 volts A.C. at the junction point 42 is also applied over a conductor 72 and through a diode 75 and a filter 76 to a conductor 77. This rectified potential is then applied over a conductor 80 to the lower end of the relay winding 56. The upper end of the relay 56 is connected through a resistance 81 to terminal "1" of the plug 35, the now-closed switch 36 and terminal "2" of the plug to the grounded junction point 45. Consequently, the relay winding 56 is energized and the armature 55 associated therewith is drawn thereto.

So far, only the armature 55 has been described as being drawn to the relay winding 56. Two other armatures, however, are associated with the relay winding 56, and these armatures are designated by the numerals 82 and 85 in FIG. 2. Since the relay winding 56 is energized, the armature 82 is disconnected from a front contact 86 which is in the energizing circuit of a relay winding 87. Because the armature 82 is not connected to the front contact 86, the relay winding 87 is de-energized at this time. This is so since, even though the lower end of the relay winding 87 is connected through a resistor 90 to the conductor 77 which has 110 volts D.C. applied thereto, the upper end of the relay winding 87 is connected over a conductor 91 to the armature 82 which is open. In summary, therefore, it can be seen that with the power switch 41 closed and the start switch 36 closed as shown in FIG. 2, the relay winding 56 is energized and the relay windings 61 and 87 are deenergized.

Assume now that the pressure of a gas system is to be measured. The upper end of the tube 10 is connected to the system, and the gas passes through the cut-off tube 11 to fill the tube 10 below the piston. To start such a measurement, the push-to-open start switch 36 is depressed to open the circuit across terminals "1" and "2" of the plug 35. Since the start switch 36 was in the circuit for the relay winding 56, this winding is de-energized when the start switch 36 is opened. When the relay winding 56 is de-energized, the armature 55 and the back contact 57 are opened, the armature 82 and the front contact 86 are closed and the armature 85 and a back contact 92 associated therewith are opened. When the armature 55 and the back contact 57 are opened, the circuit is not affected thereby. This is so since the relay winding 61 was de-energized even when they were closed since the tetrode 65 was nonconducting at this time. However, when the armature 85 and the back contact 92 are opened, a circuit over a conductor 95 and to the conductors 20—20 of the solenoid 17 is opened. Consequently, the solenoid 17 is de-energized, and the piston 16 is released.

At this time, as shown hereinabove, the armature 82 and the front contact 86 are closed; consequently, a circuit is completed now to the relay winding 87. As was shown above, this relay winding has 110 volts D.C. applied to the lower end thereof, and ground was needed on the upper end in order to energize it. When the armature 82 and the front contact 86 are closed, such a ground is provided to the upper side of the relay winding 87 over the conductor 91 by the circuit which includes a conductor 96, an armature 97 of the relay winding 61 and a front contact 100 associated therewith, and a conductor 101 to the grounded conductor 46. Therefore, the relay winding 87 is energized and its armatures 102 and 105 are drawn up, into contact with back contacts 106 and 107, respectively.

When the armature 102 closes on the back contact 106, ground is placed on the left-hand side of a clock which is designated in FIG. 2 as clock #1 and which is provided to measure the time interval $t_1$ described above. On the right-hand side of this clock, a lower conductor 110 is connected by a conductor 111 to the junction point 42 which has 110 volts A.C. applied thereto, causing clock #1 to be energized as soon as the piston 16 is released by the now de-energized solenoid 17. Also, when the relay winding 87 is energized and the armature 105 connected to the back contact 107, a holding circuit is placed across the relay winding 87 so that this winding will hold in its energized position even though the armature 82 and the front contact 86 of the relay winding 56 should be opened. It can be seen therefore, that the opening of the start switch 36 has caused the piston 16 to drop and has started clock #1 operating.

As described hereinabove, the apparatus for measuring gas pressures in accordance with the principles of present invention involves the measurement of two time intervals. The time $t_1$ was that which expired between the piston's being released and its reaching a given point along the tube after oscillations have ceased. Also, the time $t_2$ represented the time that it takes for the piston's length to pass the given point. Therefore, to measure $t_1$, clock #1 which is now energized must be de-energized after the piston 16 has stopped oscillating and has started a smooth downward movement in the tube 10. Therefore, as soon as the oscillations of the piston 16 have stopped, the start switch 36 is released so that it is again closed.

At this time, the relay winding 56 will again be energized since the switch 36 applied ground to the upper end thereof. When the relay winding 56 is energized, the armature 55 associated therewith closes upon the back contact 57 to apply, again, 110 volts D.C. to the lower side of the relay winding 61. However, there is no net effect on the relay winding 61 and the winding 61 continues to be de-energized since light from the lamp 30 continues to fall on the photocell 27 and no output is derived therefrom. Since there is no output from the photocell 27, no energizing potential is applied to terminal "3" of the plug 35, to conductors 71 and 70 and to the control grid 66 of the tetrode 65. Therefore, the tetrode 65 remains nonconductive at this time, that is, as soon as the start switch 36 is again closed.

The energization of the relay winding 56 also opens the armature 82 and the front contact 86. However, this action has no effect on the operation of clock #1 since, while the armature 82 initially grounded the relay winding 87, the relay winding furnished its own holding contact through the armature 105 and the back contact 107; consequently, the relay winding 87 continues to be energized at this time and clock #1, which is energized through the armature 102 and back contact 106 thereof, continues to operate. Finally, when the relay winding 56 is again energized upon the reclosing of the start switch 36, the armature 85 and the back contact 92 are again connected to energize the solenoid 17. Normally, the energization of the solenoid 17 at this time has no adverse effect; however, its magnetic field may have an effect on the downwardly moving piston 16. If such an effect is observed, a push-to-open switch 112 may be depressed in order to remove the solenoid 17 from the circuit. Obviously, such a switching arrangement may be automatically placed in the circuit in order to keep the solenoid 17 de-energized at this time. In summary, it can be seen that, as soon as the piston 16 stops oscillating, the start switch 36 is again closed, but there is no net effect on the circuit shown in FIG. 2 and the clock #1 continues to operate.

When the piston 16 starts to pass between the lamp 30 and the photocell 27, light is cut off from the photocell. Since, as mentioned hereinabove, the photocell 27 is of the type that has high resistance when no light is received thereon, an output is derived from the photocell 27 and applied to terminal "3" of the plug 35. From this terminal, the output of the photocell 27 is applied over the conductors 71 and 70 to the control grid 66 of the tetrode 65, rendering the tetrode conductive and placing a low potential near ground potential on its anode through a diode 115. Since the relay winding 56 is energized at this time and since its armature 55 is closed on its back contact 57, the relay winding 61 has 110 volts D.C. on its lower end and ground on its upper end. Consequently, the relay winding 61 is energized. When the winding 61 is energized, the armature 97 and the front contact 100 are opened, and an armature 116 and a back contact 117 associated with the relay winding 61 are closed. When the armature 97 and the front contact 100 are opened, ground is removed from the left-hand side of clock #1, stopping this clock so that the reading thereon is $t_1$. Also, when the armature 116 and the back contact 117 are closed, ground from the grounded conductor 46 is applied over the conductor 101 and a conductor 120, through the back contact 117 and the armature 116 to a conductor 121 and to the left-hand side of clock #2. Since 110 volts A.C. is applied from the junction point 42 and over the conductor 111 and a conductor 122 to the right-hand side of clock #2, clock #2 is energized.

It will be remembered that the key incident which caused clock #2 to be energized was the fact that the piston 16 was passing between the lamp 30 and the photocell 27 to shield light from the photocell. Consequently, when the piston 16 passes the photocell and light again strikes it, the resistance of the photocell again becomes zero, and no output is applied therefrom to terminal "3" of the plug 35. Consequently, the photocell output is removed from the conductors 71 and 70 and from the control grid 66 of the tetrode 65, again rendering the tetrode nonconductive. When the tetrode stops conducting, the relay winding 61 is again deenergized and its armatures 97 and 116 are released thereby. When the armature 116 and the back contact 117 of the relay winding 61 open, ground is removed from the left-hand side of clock #2, stopping this clock. Since clock #2 was energized only while the piston 16 was passing between the lamp 30 and the photocell 27, it can be seen that this clock measures the time ($t_2$) for the piston's length to pass the given point. In order to place the clocks in their original positions for a succeeding pressure measurement, a reset switch 125 is closed to place ground on right-hand side of the clocks, thereby resetting them. With this having been done, the circuit of FIG. 2 is in a condition to make a subsequent measurement.

In describing the operation of the gauge shown in FIG. 1 by the circuit shown in FIG. 2, it was stated hereinabove that the upper end of the tube 10 is connected to a gas system, the pressure of which is to be measured. One of the assumptions in the above description is that the volume of the system is very much greater than the volume of the tube 10 between the lower end 15 of the cut-off tube 11 and the bottom of the tube 10. In one system in which the present invention was incorporated, the volume of the system to which the gauge was attached was 8400 cc. while the gauge volume was 19.6 cc. Consequently, the use of the above-described formula, $P=P_M(x)/L-x)$, instead of the more-detailed equation for P that was first given resulted in an error which was at most 0.25%, while it can be shown that it probably was less than 0.20%. This error, for all practical purposes, can be neglected.

When beginning a pressure measurement, the start switch 36 is depressed to de-energize the solenoid 17 and thereby release the piston 16 and start clock #1 operating. As the piston 16 drops down the tube 10, after it passes the lower end 15 of the cut-off tube 11, it compresses the gas in the tube 10. The energy of the falling piston 16 is dissipated by its performing a series of damped oscillations. At a given point along the tube 10, these oscillations cease, and this is the point $x_1$ in the above-given equation, $x=x_1+t_1l/t_2$. Then, as the piston 16 continues to fall, it comes between the lamp 30 and the photocell 27. When this occurs, light is cut off from the photocell 27 so that clock #1 ceases to operate and clock #2 is energized. As soon as the piston 16 passes from between the lamp 30 and the photocell 27, clock #2 ceases to operate. Consequently, the other two factors, $t_1$ and $t_2$, in the above-given equation are known so that the equilibrium position $x$ can be computed.

Referring now to the graph shown in FIG. 3, the solid line shown therein is the actual motion of the piston 16 as it falls down the tube 10. It can be seen that, initially, it starts a series of high-amplitude oscillations which successively diminish in size. By the given point along the tube 10, such oscillations have ceased. This is the so-called given point, $x_1$, in the above-described equations. After the piston 16 passes this point, it falls down the tube 10 with a constant velocity. This is shown in the right-hand side of FIG. 3, wherein the piston 16 is shown as falling in a straight line between points $x_1$ and $x_2$. By extrapolating this straight line in the constant velocity region of the piston to zero time, the value of $x$, the equilibrium position, can be obtained for use in the formula, $P=P_M(x)/(L-x)$. As described above, this value of $x$ is determined by the formula, $$x=x_1+t_1l/t_2=x_1+t_1v$$

The gauge described hereinabove has the advantages of being simple, rugged, bakeable, independent of gas composition (with the exception of condensables), relatively insensitive to ambient temperature fluctuations and non-contaminating. Many variations of the above-described apparatus for making gas-pressure measurements can be made by those skilled in the art. For instance, the bottom of the tube 10 could be connected through a valve to an auxiliary volume. This would allow an expanded reading of higher pressures. Also, the range and scale could be modified by attaching auxiliary volumes to the side of the tube, thereby expanding the scale within chosen pressure ranges. The range over which the pressures could be measured with a given accuracy could also be modified by using different-weight pistons, selected from group stored in the system. An alternate way of changing the piston's weight is to insert weights in a hole drilled into the top of the piston. The use of pistons with holes drilled into the tops can prove useful especially in the lower-pressure-range gauges since they would afford an increase in precision in time measurements over solid pistons. Here, however, limits must exist on the ratio of surface area in contact with the tube to weight since, if the friction forces become too large relative to the other forces acting, the piston motion may become erratic and impair the gauge operation.

What is claimed is:

1. Apparatus for measuring the pressure of gas in a system, which comprises a vertically-mounted tube, a piston mounted for axial sliding movement within the tube and with some leakage being provided between the piston and the tube, means for connecting the tube with the gas system the pressure of which is to be measured in order to fill the tube with such gas, means for suspending the piston at a predetermined height within the tube and for releasing the piston so that the piston slides down the tube to compress the gas therein, the releasing of the piston causing damped oscillations of the piston superimposed on a constant downward velocity thereof, and means for measuring the intervals of time elapsing between the time that the piston is released and its reaching a plurality of predetermined points in the tube after the oscillations cease in order to calculate the point to which the piston would have come to rest had there been no leakage between the piston and the tube.

2. Apparatus for measuring the pressure of gas, which comprises a vertically-mounted tube filled with the gas at the pressure to be measured, a piston designed for axial sliding movement within the tube with some leakage being provided between the piston and the tube, means for suspending the piston near the upper end of the tube until a pressure measurement is to be made and for releasing the piston at that time, the releasing of the piston causing it to fall down the tube to compress the gas therein with the falling piston executing a series of damped oscillations superimposed on a constant downward velocity, a first timer, means for actuating the first timer between the time that the piston is released by the releasing means and a time after the oscillations thereof have ceased and the piston has reached a first predetermined point down the tube, a second timer, and means for actuating the second timer between the time when the piston has reached the first predetermined point and a second predetermined point further down the tube, the readings of the timers permitting the calculation of the point to which the piston would have come to rest had there been no leakage between the piston and the tube.

3. Apparatus for measuring the pressure of gas, which comprises a vertically-mounted tube filled with the gas at the pressure to measured, a piston fitted within the tube for axial sliding movement therewith and with some leakage permitted between the piston and the tube, means for suspending the piston near the upper end of the tube until a pressure measurement is to be made and for releasing the piston at that time, the releasing of the piston causing it to fall down the tube, to compress the gas in the lower part thereof and to execute a series of damped oscillations superimposed on a constant downward velocity, a first and a second timer, a photocell and lamp arrangement secured adjacent to opposite sides of the tube at a predetermined point along its length with such point being below that at which the oscillations of the piston have ceased, means associated with the piston-releasing means for actuating the first timer when the piston is released, and circuit means energized by the photocell with the first timer being so connected thereto that it measures the time that it takes the piston to reach the predetermined point and the second timer being so connected thereto that it measures the time that it takes for the piston to pass completely past such predetermined point, the measured times being instrumental in calculating the point along the tube to which the piston would have come to rest had there been no leakage between the piston and the tube.

4. Apparatus for measuring the pressure of gas which comprises a vertical tube connected to a gas system the pressure of which is to be measured, a piston mounted for axial sliding movement within the tube and with some leakage being provided between the piston and the tube, means for suspending the piston within the tube near the upper end thereof and for releasing the piston when a measurement of the pressure of the gas within the tube is to be made, the releasing of the piston causing it to fall down the tube and thereby compress the gas therein with the falling piston executing a series of damped oscillations superimposed, because of the leakage between the piston and the tube, upon a constant downward velocity, a photocell secured adjacent to the tube at a point along its length which is below that at which the damped oscillations of the piston cease, a circuit including two timers connected to the photocell and controlled by the output thereof, and switching means associated with the piston-releasing means for energizing a first of the timers when the piston is released, the circuit and its connections to the photocell and to the first timer being such that the first timer measures the time elapsing between the releasing of the piston and its reaching the predetermined point where it influences the photocell and the circuit and its connections to the photocell and to the second of the timers being such that the second timer measures the time that the downward-moving piston takes to pass the predetermined point and cease to influence the photocell.

No references cited.

RICHARD C. QUEISSER, *Primary Examiner.*